United States Patent [19]

Knecht

[11] 4,348,352

[45] Sep. 7, 1982

[54] RACK FOR INTERMEDIATE STORAGE OF NUCLEAR REACTOR FUEL ELEMENT BUNDLES

[75] Inventor: Max Knecht, Winterthur, Switzerland

[73] Assignee: Sulzer Brothers Limited, Winterthur, Switzerland

[21] Appl. No.: 192,506

[22] PCT Filed: May 22, 1979

[86] PCT No.: PCT/CH79/00072

§ 371 Date: Feb. 1, 1980

§ 102(e) Date: Feb. 1, 1980

[87] PCT Pub. No.: WO80/00046

PCT Pub. Date: Jan. 10, 1980

[30] Foreign Application Priority Data

Jun. 9, 1978 [CH] Switzerland ............... 6310/78

[51] Int. Cl.³ ........................................... G21C 19/00
[52] U.S. Cl. ................................ 376/272; 250/506.1
[58] Field of Search ............... 116/30; 250/506, 507; 376/272

[56] References Cited

U.S. PATENT DOCUMENTS

| 4,042,828 | 8/1977 | Rubinstein | 250/507 |
| 4,088,897 | 5/1978 | Soot | 250/507 |
| 4,248,668 | 2/1981 | Dixon | 250/507 |

*Primary Examiner*—Donald P. Walsh
*Attorney, Agent, or Firm*—Kenyon & Kenyon

[57] ABSTRACT

After their removal from the reactor, fuel element rods of nuclear reactors are stored in bundles in a water tank before they are transported away. The invention relates to a rack, to be installed in the water tank, which according to safety regulations is designed earthquake proof and receives the fuel element bundles in close packing. The rack has square receiving tubes for one fuel element bundle each; the receiving tubes are arranged vertically and connected with a bottom plate resistant to bending.

10 Claims, 5 Drawing Figures

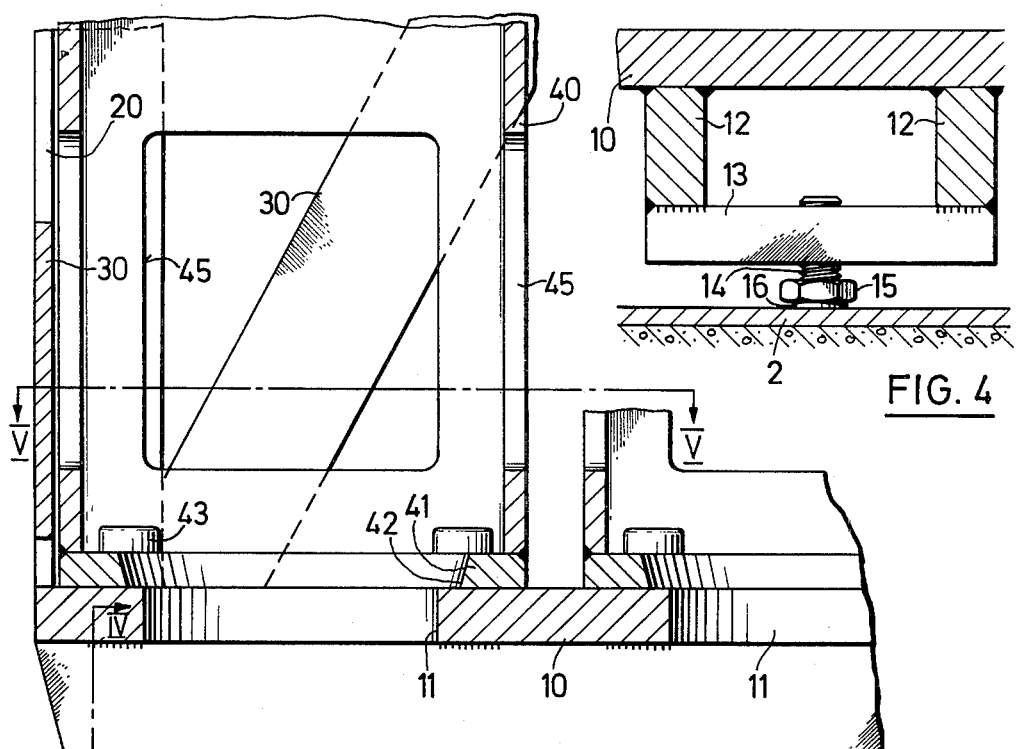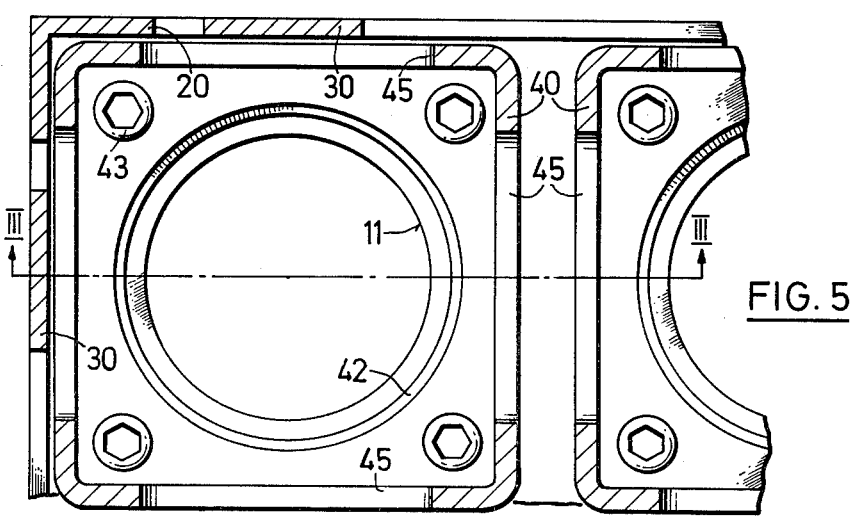

RACK FOR INTERMEDIATE STORAGE OF NUCLEAR REACTOR FUEL ELEMENT BUNDLES

This invention relates to a rack for intermediate storage of nuclear reactor fuel element bundles.

Racks for intermediate storage of new fuel element bundles or of bundles removed from nuclear reactors according to the head concept of the above claim 1 are known, where the receiving tubes stand loosely on a bottom plate of a tank and are braced laterally by a structure which is firmly connected with the bottom plate and is braced laterally against the tank walls. Since for safety reasons—in view of earthquakes—considerable horizontal accelerations must be expected, the supporting structure, to be designed for buckling, becomes very massive if the intermediate storage areas are large. Thus, there result relatively large distances between the individual receiving tubes.

It is an object of the invention to provide an intermediate storage rack which at equal earthquake safety has smaller receiving tube distances, so that it is possible to lodge a given number of tube bundles in a smaller water tank or, in a water tank of given size, a larger number of fuel element bundles.

Briefly, the invention provides a storage rack for fuel element bundles. The rack is comprised of a bottom plate, a plurality of vertically disposed square receiving tubes each of which has an inwardly directed flange resting on the bottom plate and which defines a bore for centering a fuel element bundle and screws passing through each flange and into the bottom plate to secure the tubes to the plate. This construction not only requires less space than previously known racks, but also eliminates, either entirely or partly, any need for lateral bracing of a support sturcture against a tank wall. Thus, continuous channels disposed laterally of the rack for transfer of the fuel element bundles from the reactor safety tank and/or for manipulating the fuel element bundles can remain free.

The bottom plate may also be provided with passage openings aligned with each bore so that a first circulation path for the water cooling the fuel element in natural circulation is provided.

A plurality of ribs may also be secured to the underside of the plate to stiffen the plate. The ribs which extend at least in the direction of the longer dimension of the rack, provide a certain carrying capacity against buckling with a smaller thickness of the bottom plate and hence lower cost of material.

Vertically adjustable screws may also be secured to the above plate for vertically adjusting the plate. In this way, by an exact leveling of the bottom plate, not only are difficulties in applying the manipulator avoided, but moreover the danger of the bottom plate buckling in case of earthquakes is reduced.

Each tube may also be provided with lateral inlet openings for the passage of circulating water. This opens up additional paths for natural circulation of the water cooling the fuel elements. The cooling is thereby made more uniform and intensified.

A cover plate may also be mounted over the tubes with square openings coaxially of the tubes with a depending frame secured to the plate and vertical angle sections securing the frame to the bottom plate. This cover plate reduces by its damping the ability of the system to swing in case of earthquakes. Besides, it permits a simple lateral bracing of the rack elements in the region of the upper ends of the receiving tubes, whether against each other or against the tank wall.

Diagonally disposed flat rods may also be secured at each end to a respective end of an adjacent pair of angle sections. In this way, the cover plate is able to absorb higher transverse forces.

The rack may also be sub-divided into a plurality of units with connecting elements screwed into the cover plates to secure adjacent units together. In addition, the cover plates are rigidly connected with one another also in the direction of traction.

The connecting elements may also function as guides for installation and removal of the fuel element bundles. By transferring the guide function to the connecting elements, the cover plate is saved from additional chip-removing machining.

These and other objects and advantages of the invention will become more apparent from the following detailed description taken in conjunction with the drawings wherein:

FIG. 3 shows—in the same enlargement—the detail III from FIG. 1.

FIG. 4 represents a section along plane IV—IV in FIG. 3.

FIG. 5 is a horizontal section along plane V—V in FIG. 3.

Figure 1:
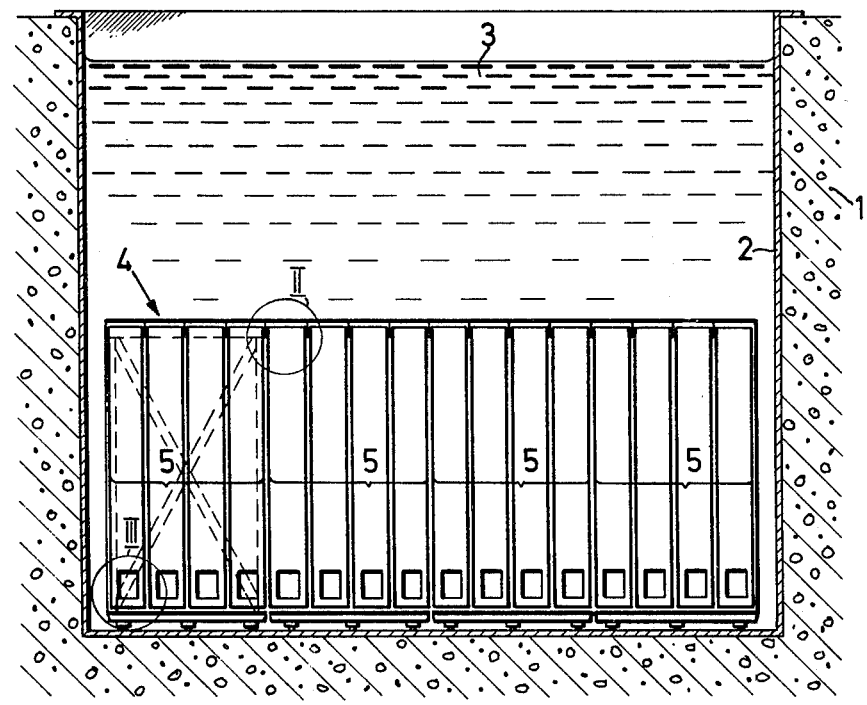
FIG. 1 shows a vertical section through a tank containing a rack according to the invention.

In a tank 1 made of reinforced concrete, lined with stainless steel plate 2 and filled with water 3, there is a rack 4 which consists of several adjacent rows of rack units 5, of which only one row is visible in the drawing. Each rack unit consists of a solid bottom plate 10, with bores 11 in square division. Between the bores 11, on the underside of the bottom plate 10, mutually parallel ribs 12 are welded on, which are connected together in pairs by straps 13 (See FIG. 4). In the straps 13, threaded bores are provided, in which threaded bolts 14 with hexagonal head 15 are fitted. On the end face, the head 15 of these bolts 14 is machined slightly concave. Against this concave surface a disk 16 applies, whose upper face is convex. The bolts 14 take support through these disks 16 on the steel plate 2 of the tank bottom serving as a lining. To each of the four corners of the bottom plate is welded the end face of an angle section 20 extending upward. The four angle sections 20 are connected at their upper ends with a square frame 21 of flat iron standing upright, which is welded to the circumference of a square cover plate 25. This square cover plate has square openings 26, (See FIG. 2) aligned with the bores 11 of bottom plate 10, the sides of the openings extending parallel to the sides of the cover plate 25. In the center between adjacent rows of openings 26, on the underside of the cover plate 25, are crossing thick ribs 28, also welded to the cover plate 25. The corners between the angle sections 20 and bottom plate 10 on the one hand, and the angle sections and frame 21, on the other, are connected together by diagonally arranged traverses 30. In the corner points between four square openings 26, cross-shaped stop and guide pieces 31 for the loading device are screwed on the cover plate 25. At the edge of the cover plate 25 of a unit, similar cross-shaped stop pieces 32 are arranged, which span the adjacent cover plate and thus connect the individual units together.

Figure 2:
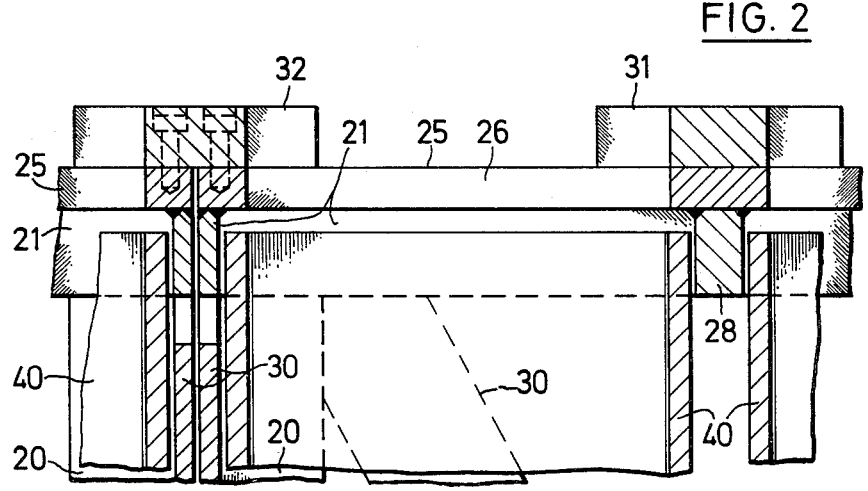
FIG. 2 shows, greatly enlarged, a detail marked II in FIG. 1.

Under each of the square openings 26, on bottom plate 10, a vertical square receiving tube 40 is mounted, which, leaving little vertical clearance, extends up to the cover plate 25 (See FIG. 2). At the base, the receiving tubes 40 terminate in an inwardly directed flange 41 (See FIG. 3) which rests on the bottom plate 10 and defines an upwardly flaring conical bore 42 for centering the fuel element bundle and four passage holes for the bolts of screws 43. The screws 43 are fitted in matchingly arranged threaded bores of the bottom plate 10.

In the four sidewalls of the square receiving tubes 40, at small distance from flange 41, rectangular cutouts 45 are provided, which serve as inlet openings for the naturally circulating water. The square openings 26 in cover plate 25 are wider than the inside contour of the receiving tubes 40 by the slight lateral clearance existing between the upper end of the receiving tubes 40 and the frame 21 or respectively the ribs 28. For capturing the neutron radiation, the square receiving tubes 40 have boron inserts not shown.

When the installation is assembled, the receiving tubes 40 are screwed on the finished bottom plate 10 and only then the cover plate 25 with the frame 21 is welded onto the angle sections 20. Then the rack units 5 are introduced into the tank and adjusted there by turning the screws 14 and connected together by the stop pieces 32. After exact dimensional check, water is filled into the tank. Then charging of the receiving tubes 40 with fuel element bundles can take place, the charging device being braced against the guide pieces 31, 32 and centered. For this purpose the guide pieces 31, 32 may have guide bores or slots.

In its simplest form (not shown) the rack consists merely of a bottom plate 10 with the receiving tubes 40 screwed thereon. The structure 20, 21, 30 and the cover plate 25 are eliminated.

At the receiving tubes 40, the vertical straps remaining in the region of the cutouts 45 may be reinforced for example by angle sections welded on internally.

I claim:

1. A storage rack for fuel element bundles, said rack comprising,
   a bottom plate;
   a plurality of vertically disposed square receiving tubes, each tube having an inwardly directed flange resting on said plate and defining a bore for centering a fuel element bundle; and
   screws passing through each flange and into said plate to secure said tubes to said plate.

2. A storage rack as set forth in claim 1 wherein said plate has passage openings aligned with each rack said bore.

3. A storage rack as set forth in claim 2 which further comprises a plurality of ribs secured to an underside of said plate to stiffen said plate.

4. A storage rack as set forth in claim 1 which further comprises vertically adjustable screws secured to said plate for vertically adjusting said plate.

5. A storage rack as set forth in claim 1 wherein each tube has lateral inlet openings for the passage of circulating water.

6. A storage rack as set forth in claim 1 which further comprises a cover plate mounted over said tubes and having square openings coaxially of said tubes, a depending frame secured to said plate and vertical angle sections securing said frame to said bottom plate.

7. A storage rack as set forth in claim 6 which further comprises diagonally disposed flat rods secured at each end to an end of an adjacent pair of angle sections.

8. A storage rack as set forth in claim 7 wherein said rack is sub-divided into a plurality of units, each unit having a bottom plate, a cover plate and a plurality of tubes between said plates, and connecting elements screwed into adjacent cover plates to secure adjacent units together.

9. A storage rack as set forth in claim 8 wherein said connecting elements are guides for installation and removal of fuel element bundles.

10. A storage rack as set forth in claim 6 which further comprises a latticework of ribs secured to said cover plate within said frame.

* * * * *